United States Patent Office 2,804,473
Patented Aug. 27, 1957

2,804,473

PRODUCTION OF LOWER ALIPHATIC PERACIDS

Benjamin Phillips, Frederick C. Frostick, Jr., and Paul S. Starcher, Charleston, W. Va., assignors to Union Carbide Corporation, a corporation of New York No Drawing. Application November 25, 1953, Serial No. 394,493

18 Claims. (Cl. 260—502)

This invention relates to peracids. More particularly, it is concerned with an improvement in processes for making lower aliphatic peracids, as for instance peracetic acid and perpropionic acid.

Peracids have been known for somewhat more than fifty years, dating back to the work of Baeyer and Villiger who, in 1900, prepared perbenxoic acid by the saponification of dibenzoyl peroxide. Thereupon peracetic acid, perpropionic acid and monoperphthalic acid were also synthesized, all within the following three years. It was quickly recognized that these compounds were powerful oxidizing agents, in many ways resembling hydrogen peroxide. The importance of the peracids is due not only to their characteristics as strong oxidizing agents for general use but also to the fact that there are a number of specific chemical transformations which can be effected by them with high efficiency.

Among the more useful and important of these reactions with their representative equations are:

(a) The oxidation of unsaturated compounds to the corresponding alkylene oxide derivatives or epoxy compounds

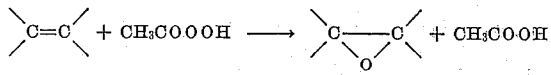

(b) The oxidation of organic sulfides to sulfoxides

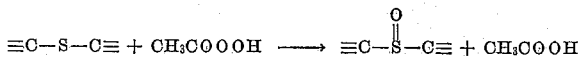

(c) The oxidation of organic sulfides to sulfones

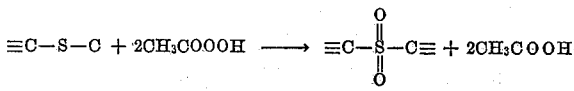

(d) The oxidation of tertiary amines to amine oxides

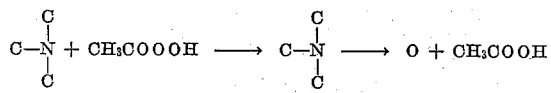

(e) The cleavage of diketones (1)
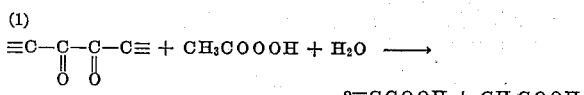

(2)
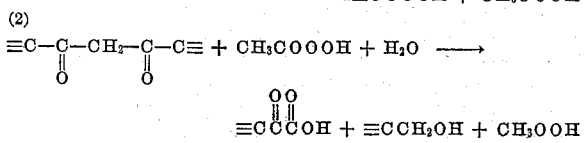

(f) The oxidation of certain aromatic compounds to quinones (1)
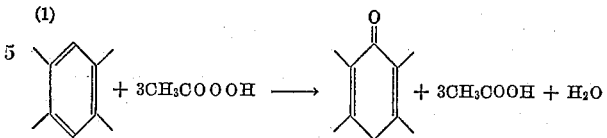

(2)
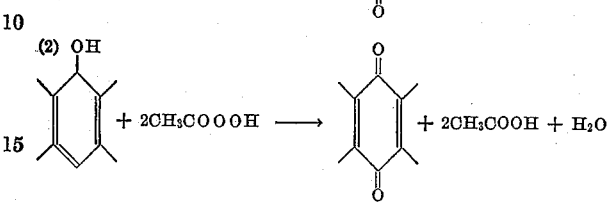

Of these, the oxidation of an unsaturated compound to its corresponding alkylene oxide derivative appears currently to be the most valuable. This reaction was discovered in 1909 by Prilezhaev (Ber. 42, 4811–4815) who prepared several epoxides in this manner.

Much of the early work with peracids, particularly in the synthesis of alkylene oxides (oxiranes), was carried out with perbenzoic acid. In recent years, an increase in the use of peracetic acid has taken place, undoubtedly due to a more favorable economic position of acetic acid over benzoic acid derivatives. Relatively little work has been done evidently with peracids other than these two.

As far as is known, prior methods for preparing aliphatic peracids made use of hydrogen peroxide or ozone as the primary sources of active oxygen. It was known, however, to prepare perbenxoic acid by the oxidation of benzaldehyde with molecular oxygen, but attempts to apply that synthesis to the preparation of aliphatic peracids did not meet with success.

The present improvement is based on our discovery that aliphatic peracids can be produced by cracking an aliphatic peracid-aldehyde addition product to liberate the aliphatic peracid therefrom. The liberated peracid is then separated forthwith from the aldehyde co-product of the cracking step before the aldehyde and the peracid can react with one another to an appreciable extent. The aliphatic peracid-aldehyde addition product can itself be made by the oxidation of the aldehyde with molecular oxygen at a low temperature.

The overall reaction can be represented by the following equation:

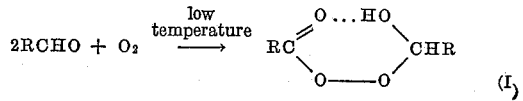

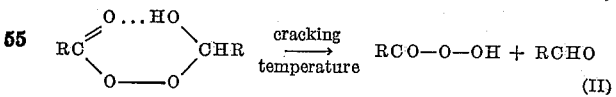

where R is a lower aliphatic group composed of carbon and hydrogen. Preferably, R is methyl or ethyl. As a matter of convenience in the description which follows, reference will be had more particularly to the aldehyde in which R is methyl, namely, acetaldehyde.

When acetaldehyde is reacted with molecular oxygen, as in air or cylinder oxygen for instance, the initial product is a peroxide. If the reaction is carried out at a temperature above 20° C., or if certain catalysts (for instance, manganese ions, water or the like) are present, the peroxide as it is formed decomposes with the formation of acetic acid. By conducting the oxidation at a temperature not higher than 15° C., and in the absence of catalysts favoring the formation of acetic acid, the peroxide is formed with high efficiency to the virtual exclusion of acetic acid as a product, as represented by Equation I. A temperature of about −5° to 0° C. is preferred. When the oxidation is conducted to a high degree of conversion under such conditions, the peroxide crystallizes from unoxidized acetaldehyde in the form of colorless needles. As with other crystalline peroxides, these peroxide needles are sensitive to shock, and merely the stirring of a slurry of the crystals can result in an explosion (Bloomfield and Farmer; J. Soc. Chem. Ind. 54, 125T (1935)). By the use of an excess of the aldehyde or other solvent which keeps the peroxide crystals in solution, the possibility of such an explosion is avoided. Acetone, acetic acid, acetal, methyl ethyl ketone, ethyl acetoacetate, butyl acetate and the like are illustrative of solvents which are non-reactive with the peroxide and useful as solvents therefor. Acetaldehyde can also be used as the solvent to prevent the possibility of an explosion provided the oxidation is not conducted to a degree of conversion so high that the peroxide crystallizes out of solution. The unreacted aldehyde serving as solvent can subsequently be replaced by another solvent, if desired, in carrying out our process.

The molecular structure of this peroxide is known with a reasonable degree of certainty, although absolute proof may seem to be lacking because of the difficulties of purifying and weighing this unstable peroxide. Without wishing to be bound by any particular structure or theory, it appears that peroxide initially formed by the reaction of molecular oxygen with acetaldehyde at low temperature has a structure as represented in Equation I, to which the same acetaldehyde monoperacetate has been applied. The structure, it will be noted, is analogous to that of a hemiacetal; and, accordingly, the compound may be regarded as the addition product of acetaldehyde and peracetic acid.

Acetaldehyde monoperacetate crystals melt at a temperature of 20°–22° C., well above the melting point of pure peracetic acid which melts at 0° C. Also, acetaldehyde monoperacetate is less stable at room temperatures than peracetic acid. When crystals of acetaldehyde monoperacetate are allowed to warm up to room temperature, a vigorous reaction ensues and the temperature of the molten material rises in a few seconds to over 100° C. If external cooling is applied to slow down the reaction rate, no gas is evolved and the end product is an equal weight of acetic acid of about 98 percent purity. From this equal weight relationship in the conversion of acetaldehyde monoperacetate to acetic acid it must follow that both have the same carbon, hydrogen and oxygen analysis. Loesh (P. B. 52.007, pages 23, 101) found the low-temperature acetaldehyde oxidation product to have a molecular weight of about 105 (theoretical for acetaldehyde monoperacetate, 120.1) and to contain 14 to 15 percent active oxygen. These values are admittedly only approximate since it is difficult to purify or weigh such an unstable compound. These values do seem sufficiently reliable to show that the peroxide made at low temperature has the empirical formula $C_4H_8O_4$. Additional evidence bearing on the structure of acetaldehyde monoperacetate is the fact that the reaction of acetaldehyde with oxygen at low temperatures comes to a standstill when one mole of oxygen has been consumed for each two moles of acetaldehyde.

In preparing acetaldehyde monoperacetate, oxygen is diffused into acetaldehyde at a temperature below 15° C. A temperature of about −5° to 0° C. is preferred. If desired, the oxygen can be in admixture with non-reactive gases. For instance, air can be used. As set forth above, when the oxidation is carried to a high degree of conversion of the aldehyde (i. e. when the unreacted aldehyde remaining would be insufficient to keep the peroxide in solution), the possibility of explosion is avoided by the use of some other solvent which does keep the peroxide crystals in solution. The solution of acetaldehyde monoperacetate must, of course, be kept cold, since a vigorous reaction would otherwise ensue with formation of acetic acid. A storage temperature of 0° C. and below is preferred.

The oxidation of acetaldehyde to acetaldehyde monoperacetate is best carried out in the presence of a catalyst. Salts of the heavy metals, for instance salts of cobalt, of copper, of iron and the like are powerful catalysts for this reaction. At the same time, the presence of metal salts decreases the stability of the peroxide that is formed and often causes side reactions during subsequent use of the peroxide. For good results when a metal salt is used as the catalyst, the amount of such salt should not exceed 5.0 percent based on the acetaldehyde inclusive of any amount of acetaldehyde present as solvent. On the other hand, an amount less than 0.0001 percent on the same aldehyde basis has not been found to be effective as catalyst. An amount which is about 0.01 percent is preferred. The reaction can also be catalyzed by irradiating the acetaldehyde with ultraviolet light or by a small amount of ozone in the oxygen. Because of the tendency of metal salts to decrease the stability of the aldehyde monoperacetate and peracetic acid, and because of the possibility of causing side reactions during subsequent use of the peracetic acid solutions, we prefer to use either ultraviolet light or ozone for the catalysis.

The solution of acetaldehyde monoperacetate must, of course, be kept cold prior to use. If it is allowed to warm up to room temperature, a vigorous reaction will ensue with formation of acetic acid. Before converting the acetaldehyde monoperacetate to peracetic acid it is usually desirable, when other solvent is present, first to distill off free or unreacted aldehyde. By removing the free acetaldehyde at this time, a higher yield of peracetic acid and less by-product acetic acid result. The removal of free acetaldehyde is not essential to the process, however, and where it is desired to simplify the mechanics of the peracetic acid production at the expense of the yield, the acetaldehyde-stripping step can be omitted.

The removal of aldehyde by distillation is carried out under reduced pressure, and either a batchwise or a continuous distillation procedure can be employed. When done batchwise, the temperature is preferably kept below 10° C. When the residence time of the liquid is less, as in continuous distillation, a higher temperature can be used. With such a higher distillation temperature, however, the acetaldehyde monoperacetate must either be cooled again quickly, or used immediately for conversion to peracetic acid.

The succeeding step in the production of peracetic acid from acetaldehyde monoperacetate, represented in Equation II, can be carried out catalytically, or non-catalytically. In either case, provision should be made for the rapid removal of the aldehyde coproduct of the reaction in order to minimize the formation of acetic acid from interaction of the aldehyde with the peracetic acid.

If acetaldehyde monoperacetate were in equilibrium with acetaldehyde and peracetic acid at temperatures in the neighborhood of 0° C., it should be possible to remove the acetaldehyde by distillation at reduced pressure, inasmuch as solutions of acetaldehyde monoperacetate are reasonably stable at those low temperatures. In accord with well-established principles, the equilibrium would shift as the aldehyde is removed so that a residue would eventaully be produced containing free peracetic acid and no acetaldehyde. According to our experience, the equilibrium at low temperatures is almost completely in favor of acetaldehyde monoperacetate and the speed of decomposition of it to acetaldehyde and peracetic acid too slow to permit the equilibrium to shift at a useful rate. By the addition of an acid catalyst, however, the rate of attainment of equilibrium is increased and it becomes possible to carry out the above procedure for preparing a stable solution of peracetic acid.

This catalytic low temperature decomposition of acetaldehyde monoperacetate can be carried out at temperatures as low as −10° C. while at temperatures of 50° C. or above, no catalyst is required.

As catalyst any acidic catalyst of the type useful in esterification reactions can be employed, such as for instance, sulfuric acid, para-toluene sulfonic acid and the like. As in the case of other chemical equilibria, the contact time required to convert acetaldehyde monoperacetate to peracetic acid is a function of the temperature, the catalyst and the rate of removal of the aldehyde. At temperatures of about −10° C. to +5° C., a contact time of about the range of one to three hours is required. Hence, at this temperature and time, a batch operation would be indicated. With higher temperatures of 15° C. and above, the contact time is shortened correspondingly and at such temperatures it is preferable to conduct the reaction in continuous fashion, as in a calandria or continuous still, for instance.

Although the use of a catalyst permits the reaction to be carried out at a lower temperature, as described above, a non-catalytic cracking is preferred. The cracking reaction can be carried out by feeding the acetaldehyde monoperacetate into the kettle of a conventional still (comprising a kettle provided with a fractionating column), which contains an inert solvent under reflux. It is essential that the solvent either have a boiling point above the boiling point of the peracetic acid or that it will form an azeotrope therewith. The still is operated under reduced pressure to provide a kettle temperature within the range of 50° C. to 150° C., the particular temperature employed being dependent upon such factors as the nature of the solvent and the rate of breakdown of acetaldehyde monoperacetate to acetaldehyde and paracetic acid in the particular solvent medium present. The condener at the still head is maintained at a temperature such that the peracetic acid and the solvent are condensed, while the aldehyde that is liberated in the reaction is allowed to go past the still head and is recovered in a cold trap or scrubbing system along with any low boiling solvent to be removed. There is continuously removed from the still head the peracetic acid in the form of a solution in the particular solvent chosen.

By another procedure which gives higher yields, the solution of acetaldehyde monoperacetate is completely vaporized in a heated zone and heated to a temperature within the range of 50° to 250° C., approximately. The vapors are then passed to a condenser or dephlegmator. The acetaldehyde monoperacetate, during its residence in the heated zone, breaks down to peracetic acid and acetaldehyde. The vapors to the dephlegmator, accordingly, contain peracetic acid, acetaldehyde from the decomposed paracetate plus any other acetaldehyde present, and solvent. The dephlegmator is maintained at such a temperature as to condense the peracetic acid and solvent while allowing the acetaldehyde to pass through along with any other low-boiling material that might be present. The latter are recovered by condensation, by absorption in a suitable solvent, or by other suitable expedient. The heated zone for this procedure can be a section or coil of piping or tubing, heated externally by steam or other convenient source. Practically any device which accomplishes a rapid vaporization with simultaneous heating to a temperature of 50° to 250° C. could be used. Thus a jacketed kettle, a flask immersed in a heated oil bath or a calandria could also be used with equally satisfactory results.

In following this procedure it is acceptable to use acetaldehyde monoperacetate solutions in which unreacted acetaldehyde is the only solvent, or substantially so. In such case, it is preferred to dilute the vapors emerging from the heated zone with the vapors of an inert solvent and to recover as a condensate from the dephlegmator, a solution of peracetic acid in the inert solvent. However, it is not necessarily uneconomic to operate with acetaldehyde as the only solvent, or substantially so. Under these conditions, some of the acetaldehyde condenses in the dephlegmator along with the peracetic acid and reacts with it. The product in this case is a solution of peracetic acid in acetic acid.

A possible explanation for the higher yields obtained when the process is carried out using complete vaporization followed by condensations is that the aldehyde vapors do not pass through a fractionating column in contact with the peracetic acid. Another advantage is that this procedure permits a wider choice of solvents. Thus, it has been operated with solvents boiling lower than peracetic acid as well as with solvents boiling higher than peracetic acid. For instance, peracetic acid solutions in acetone, ethyl acetate, acetic acid, butyl acetate, dibutyl ether have been prepared by this procedure.

Instead of passing the heated vapors from the pyrolysis zone containing peracetic acid, acetaldehyde or other solvent into a condenser or dephlegmator as described above, the vapors can instead be fed continuously to a fractionating column, near the middle thereof, with the acetaldehyde being taken off at the head of the column. For complete removal of the acetaldehyde from the peracetic acid, it is preferred to feed inert solvent vapors, from a side-boiler or calandria, into the bottom of the fractionating column. These hot solvent vapors rising through the descending peracetic acid solution effect vaporization of any dissolved acetaldehyde. The peracetic acid is obtained as a residue at the bottom of the column, in the form of a solution in the particular inert solvent employed.

Preferably, this continuous rectification is carried out under reduced pressures, with the aim of minimizing the side-reaction oxidation of acetaldehyde by peracetic acid which proceeds at a lower rate at the consequent lower operating temperatures.

In employing this procedure wherein the solution of acetaldehyde monoperacetate is completely vaporized and the vapors subjected to continuous rectification, good results are obtained with a rectification solvent normally boiling between 21° C. and 110° C., which are the boiling points of acetaldehyde and peracetic acid, respectively. In order still further to minimize the contact between acetaldehyde and peracetic acid, a rectification solvent having a normal boiling point between 30° and 100° C. can be used to good advantage, and is preferred. More specifically, acetone and ethyl acetate are representative of solvents which are very satisfactory for this purpose. In general, the presence of a small amount of one or more higher boiling solvents does not interfere with the process, provided there is a sufficient amount of lower boiling solvent also present to effect a rapid separation of acetaldehyde and peracetic acid in the column. This procedure involving the feature of continuous rectification gives very satisfactory results and yields as high as 97 percent of the theoretical, based on the acetaldehyde monoperacetate, have been obtained.

Our process has the advantage that it permits the manufacture of peracids at far lower costs than prior processes by reason of the use of inexpensive starting materials. Our process also readily provides peracids that are free of impurities commonly present in peracids made by prior methods, which impurities interfere with the preparation of epoxides. Solutions of peracids made by our process are substantially free of water, hydrogen peroxide, mineral acids, and salts; and the concentration of any carboxylic acids present can be, if desired, far lower than in the case of peracids made by other methods. Also, our process permits of a wide choice of solvents for the final product solution.

In the commercial operation of our process it is feasible and preferred to reuse the acetaldehyde recovered from the cracking of acetaldehyde monoperacetate for the manufacture of more acetaldehyde monoperacetate. As will be evident, the stoichiometry of the process requires but one mole of acetaldehyde for the manufacture of one mole of peracetic acid. Acetaldehyde on the other hand is a starting material for the manufacture of acetic acid. When the peracetic acid produced by this process is used as an oxidizing agent, as for example in the epoxidation of an olefin, acetic acid is a coproduct, in the ratio of one mole per mole of peracetic acid used. Although in summation these steps amount of the conversion of acetaldehyde to acetic acid, a versatile and valuable oxidizing agent has additionally been made available by our improvement. In addition to all the other advantages the improvement fits in well with manufacturing schemes.

The following examples are illustrative.

*Example 1*

A mixture of 264 grams of acetaldehyde (6 moles) and 88 grams of acetone was charged to a cylindrical glass reactor provided with a diffuser. This solution was cooled to −4° C. and irradiated with ultraviolet light while oxygen was diffused into the liquid below the surface near the bottom of the reactor. An exothermic reaction with rapid absorption of oxygen took place. After two hours, the concentration of acetaldehyde monoperacetate was found by analysis to be 46 percent, by weight. At this point, fresh acetaldehyde-acetone mixture of the same composition was fed into the top of the reactor. At the same time, oxidized product was removed from the bottom of the reactor through a discharge line so arranged as to maintain a constant level of liquid in the reactor. Over a period of eight hours and ten minutes, 1074 grams of acetaldehyde-acetone mixture was fed into the reactor corresponding to a rate of 167 milliliters per hour. Over the same period, 1230 grams of peroxide solution containing 45 percent of acetaldehyde monoperacetate (corresponding to a conversion of 50 percent) was removed from the reactor. The temperature was maintained at approximately −4° C. throughout the run.

*Example 2*

Three hundred grams (6.82 moles) of acetaldehyde and 100 grams of glacial acetic acid were charged to a cylindrical glass reactor provided with a diffuser. The mixture was cooled to 0° C. and irradiated with ultraviolet light while oxygen was introduced through the diffuser into the liquid near the bottom of the reactor as fast as it could be absorbed. After a period of 170 minutes, the reaction was terminated. The reaction temperature over this period was maintained in the range of 0° C. to 4° C. The product was found upon analysis to contain 53 percent acetaldehyde monoperacetate corresponding to a conversion of 60 percent. The solution was added to 120 grams of butyl acetate maintained at a temperature of 0° C. The acetaldehyde was then removed under a reduced pressure of 10 millimeters of mercury absolute, the kettle being kept at a temperature of 0° C. throughout the operation. The solution thus obtained had the following composition: acetaldehyde monoperacetate, 48 percent; acetic acid, 25 percent; and butyl acetate, 27 percent.

*Example 3*

A solution of acetaldehyde monoperacetate was prepared by the low-temperature oxidation of acetaldehyde in ethyl acetate by oxygen. The solution, amounting to a total of 558 grams, was found upon analysis to contain 156 grams of acetaldehyde monoperacetate, 65 grams of acetaldehyde and 16.7 grams of acetic acid. The cold solution was fed at the rate of 1320 to 1500 milliliters per hour to the bottom of a vertical stainless steel pipe, having a length of 50 inches and an insided iameter of 0.27 inch. The pipe was heated by boiling trichlorofluoromethane (Freon 11) in an external jacket provided for that purpose. The pressure in the pipe was held at 80 to 85 millimeters of mercury, absolute. A mixture of liquid and vapor having a temperature of about 22° to 23° C. emerged from the top of the pipe, and was passed to an entrainment separator to effect a separation of liquid from vapor. The liquid was collected in a receiver maintained at a temperature of −5° C. The vapor was condensed and collected in a receiver cooled by immersing it in a bath of acetone and solid carbon dioxide. When all the acetaldehyde monoperacetate had been passed through the pipe, 50 grams of ethyl acetate was passed through the system to sweep out the acetaldehyde monoperacetate remaining in the pipe.

There was collected as a residue product, 407 grams of a solution found upon analysis to contain 38.1 percent acetaldehyde monoperacetate. The recovery of acetaldehyde monoperacetate was almost quantitative. The solution was also found, by analysis, to contain 9.5 grams of acetaldehyde which had not been removed by this continuous distillation procedure.

*Example 4*

A solution of 300 grams of acetaldehyde in 100 grams acetone was oxidized with cylinder oxygen at a temperature of −5° C. to 0° C. and a solution obtained which was found by analysis to contain 50.4 percent by weight of acetaldehyde monoperacetate. Unreacted acetaldehyde was removed from the solution by vaporization by maintaining the solution at a temperature of −5° C. to 0° C. and gradually reducing the pressure to 10 millimeters of mercury, absolute. The resulting solution, amounting to 365 grams obtained as a residue material, was then added dropwise over a period of 2¾ hours to a still kettle equipped with a packed column four feet high and initially charged with 1710 grams of ethyl benzene. The contents of the kettle were kept boiling by maintaining a kettle temperature of 70° C. under a reduced pressure of 72 to 74 millimeters of mercupy, absolute. At the head of this still there was obtained by partial condensation with a water-cooled condenser, 1001 grams of solution. This solution was found by analysis to contain 75 grams of peracetic acid, corresponding to a yield of 60 percent based on the acetaldehyde monoperacetate.

*Example 5*

Acetaldehyde monoperacetate was prepared by passing cylinder oxygen into a mixture of 300 grams of acetaldehyde and 100 grams of acetone, irradiated with ultraviolet light as catalyst. To the resulting solution, which was found by analysis to contain 49.2 percent of acetaldehyde monoperacetate, was added 132 grams of propionic acid previously cooled to a temperature of 0° C. Most of the unreacted acetaldehyde was then removed over a period of about one-half hour by reducing the pressure to 10 millimeters of mercury, absolute, while maintaining the kettle temperature at −5° C. to 0° C.

The solution thus obtained was added dropwise at the rate of 300 to 480 milliliters per hour to a still kettle containing 1000 grams of propionic acid. The still kettle was provided with a 4-foot fractionating column packed with glass helices. The kettle contents were heated under reflux at a reduced pressure of 60 millimeters of mercury, giving a kettle temperature of 72° C. to 77° C. A distillate was continuously removed at the head of the column by partial condensation with a water-cooled condenser. A total of 711 grams of distillate containing 92 grams of peracetic acid was obtained. The yield of peracetic acid from acetalydehyde monoperacetate was 72 percent.

*Example 6*

Two hundred fifty-five milliliters of an acetic acid solution containing 131 grams of acetaldehyde monoperacetate was fed dropwise over a period of 1½ hours into a steam-heated glass flask maintained at a temperature of 96° C. The flask which was of two liters capacity was provided with a steam-heated glass tube leading to a water-cooled condenser having at its lower end a receiver surrounded by ice water. A reduced pressure of 49 to 53 millimeters of mercury absolute was maintained while at the same time 115 milliliters of acetic acid were also fed dropwise into the heated flask. A distillate amounting to 334 grams and a peroxide content corresponding to 70 grams of peracetic acid was collected in the receiver. This distillate which still contained a small amount of acetaldehyde monoperacetate was then fed through the same apparatus over a period of 1 hour 10 minutes, while from the water condenser there was collected 306 grams of solution found by analysis to contain 61.8 grams of peracetic acid. The overall yield of peracetic acid from acetaldehyde monoperacetate was 74 percent.

*Example 7*

An acetone solution containing 202 grams of acetaldehyde monoperacetate in a total of 422 grams of solution was mixed with 300 grams of cold dibutyl ether and the whole fed dropwise over a period of 2.1 hours into a steam-heated (temperature 98° C. to 98.5° C.) flask of two liters capacity. The flask was fitted with a steam-heated tube leading to a water-cooled condenser having at its discharge end a receiver surrounded by ice water. The pressure inside the equipment was maintained at 48 to 55 millimeters of mercury, absolute. There was collected 417 grams of distillate having a peroxide content corresponding to 81 grams of peracetic acid. This distillate which still contained a small amount of acetaldehyde monoperacetate was then again fed dropwise through the same apparatus over a period of eighty minutes under the same conditions. From the second pass there was obtained 388 grams of solution containing 75 grams of peracetic acid. The overall yield of peracetic acid from acetaldehyde monoperacetate was 60 percent.

*Example 8*

Three hundred seventy-five grams of an acetone solution containing 48.6 percent of acetaldehyde monoperacetate, 7.7 percent of acetic acid and 0.1 percent of the sodium salt of a partially esterified polyphosphoric acid ($Na_5$-($2$-ethylhexyl)$_5$($P_3O_{10}$)$_2$; Victor Stabilizer No. 53) was fed through a steam-heated vaporizer into the middle of a three-foot stainless steel packed column at the rate of 160 to 200 milliliters per hour. The column was operated at an absolute pressure of 150 millimeters of mercury with a head temperature of 14° C. to 15° C. About one inch from the bottom of the column acetone was fed in through a steam-heated vaporizer at the rate of 160 to 240 milliliters per hour.

A distillate collected continuously during the run amounted to 357 grams, and was free of acetic and peracetic acids. An acetone solution taken continuously from the bottom of the column during the run amounted to 392 grams and contained 27.9 percent of peracetic acid and 9.1 percent of acetic acid. The yield of peracetic acid, based on the acetaldehyde monoperacetate fed to the column was 95 percent.

*Example 9*

Three hundred fifty-six grams of an ethyl acetate solution containing 46.9 percent of acetaldehyde monoperacetate, 5.2 percent of acetic acid and 0.1 percent of the sodium salt of a partially esterified phosphoric acid (Victor Stabilizer No. 53) was fed at the rate of about 0.2 liter per hour through a steam-heated vaporizer into a three-foot stainless steel-packed column, at about the middle. The column was operated at an absolute pressure of about 70 millimeters of mercury with a head temperature of about 16° C. to 19° C. Ethyl acetate was fed through a steam-heated vaporizer into the column near the bottom at the rate of 0.18 to 0.24 liter per hour. An ethyl acetate solution taken from the bottom continuously during the run weighed 413 grams and contained 24.5 percent of peracetic acid. The yield of peracetic acid based on the acetaldehyde monoperacetate fed to the column was 97 percent.

*Example 10*

A solution of 270 grams of propionaldehyde and 90 grams of isopropyl acetate was charged to a cylindrical glass oxidizer and cooled to —4° C. The solution was irradiated with ultraviolet light, and oxygen was introduced through a diffuser near the bottom of the oxidizer for a period of two hours. At the end of that time there was obtained 398 grams of solution which was found upon analysis to contain 43.6 percent by weight of propionaldehyde monoperpropionate. This solution was mixed with 0.3 liter of isopropyl acetate cooled to a temperature of —5° C. to which had previously been added 0.4 gram of $Na_5$($2$-ethylhexyl)$_5$($P_3O_{10}$)$_2$ (Victor Stabilizer No. 53) dissolved in 0.4 milliliter of propionic acid. Unreacted propionaldehyde was removed from the solution under a reduced pressure of 10 millimeters of mercury, absolute, with the kettle contents maintained at a temperature of about —5° C. to 0° C. The resulting solution, weighing 427 grams and analyzing 39 percent propionaldehyde monoperpropionate, was fed through a stainless steel, steam-heated vaporizer to the mid-section of a three-foot stainless steel-packed column at the rate of 0.1 to 0.2 liter per hour. The column was operated at an absolute pressure of 50 millimeters of mercury and with a head temperature of 18° C. to 21° C. Isopropyl acetate was fed through a steam-heated vaporizer into the column near the bottom at the rate of 0.16 to 0.22 liter per hour. An isopropyl acetate solution taken from the bottom of the column continuously during the run weighed 443 grams and contained 17.5 percent by weight of perpropionic acid by analysis. The yield based on the propionaldehyde monoperpropionate obtained from the oxidizer was 76 percent.

*Example 11*

Over a reaction period of 5.75 hours, oxygen was introduced through a diffuser into a reactor containing a mixture of 176 grams (4 moles) of acetaldehyde and 60 grams (1 mole) of acetic acid maintained at a temperature of about —10° C. The reactor contents were irradiated with a 275-watt sunlamp (Westinghouse) throughout the oxidation. The reaction mixture was then diluted with 0.4 liter of cold chloroform and 20 grams of acetic acid containing 1.25 grams of sulfuric acid. Unreacted acetaldehyde and chloroform were next removed from the mixture at a kettle temperature of 0° C. to 5° C. by stripping under a reduced pressure of 10 to 20 millimeters of mercury, absolute, on a three-foot column equipped with a dephlegmator which was maintained at a temperature of —40° C., until the peracetic acid solution remaining in the kettle weighed about 267 grams. The peracetic acid content of the cold solution was 24 percent by analysis. When the solution was allowed to warm to room temperature, the concentration of peracetic acid dropped to 19.3 percent by weight, indicating that a small amount of acetaldehyde monoperacetate had been present. The final product was a stable solution having a peracetic acid content of 53 grams.

*Example 12*

A number of runs were made in which ethyl acetate solutions having an acetaldehyde monoperacetate content ranging from 30 to 40 percent, by weight, prepared according to the procedure of Example 3 were fed at the rate of 0.1 to 0.125 liter per hour through a jacketed glass coil which was heated by a liquid under reflux in the jacket. The temperature in each run was fixed by the choice of liquid used for heating purposes. The coil was made from glass tubing having an outside diameter of 8 millimeters and of a length to give a total internal volume of 0.48 liter. The pressure in the system was controlled at 200 millimeters of mercury, absolute. After passing through the coil, the peroxide mixture, in most cases largely in the vapor phase, was led to an updraft Friedrich condenser, which served as a dephlegmator. Unreacted acetaldehyde, along with some of the solvent, went past the dephlegmator and was collected in a cold trap. Peracetic acid, acetaldehyde monoperacetate, ethyl acetate and by-product acetic acid were condensed in the dephlegmator and collected in an ice-cooled receiver. By passing this condensate through the coil a second time the amount of unconverted acetaldehyde monoperacetate was reduced and the peracetic acid content increased. The results are summarized in the following table:

| Run | Temperature of Heating Liquid, °C. | Absolute Pressure, mm. of Hg | Percent of Total Peroxide Recovered, after— | | Yield of Peracetic acid, percent | |
|---|---|---|---|---|---|---|
| | | | 1st pass | 2d pass | 1st pass | 2d pass |
| A | 50 | 200 | 82 | 74 | 21 | 44 |
| B | 150 | 200 | 69 | 66 | 34 | 55 |
| C | 172 | 200 | 64 | 61 | 46 | 54 |
| D | 255 | 200 | 14 | 9 | 3 | 6 |

*Example 13*

Three hundred eighty grams (8.64 moles) of acetaldehyde were charged to a cylindrical oxidizer provided with a diffuser near the bottom of the oxidizer. The acetaldehyde was cooled to a temperature of 0° C. and cylinder oxygen introduced into the acetaldehyde through the diffuser as fast as it could be absorbed. The acetaldehyde was irradiated with ultra-violet light and the temperature maintained at 3° to 4° C. during the oxidation. In order to maintain the concentration of acetaldehyde monoperacetate sufficiently low to avoid the formation of crystals, the oxidation was stopped at the end of two hours. These resulted 450 grams of solution of acetaldehyde monoperacetate in unreacted acetaldehyde. The concentration of the acetaldehyde monoperacetate was found upon analysis to be 59.9 percent.

To this solution was then added 350 milliliters of cold ethyl acetate and the unreacted acetaldehyde stripped off over a period of 45 minutes at a kettle temperature of —8° to —2° C. and at an absolute pressure of 20 to 7 millimeters of mercury. There was obtained 509 grams of solution containing 224 grams of acetaldehyde monoperacetate, in solution in ethyl acetate.

This solution was fed dropwise over a period of about 1.67 hours into a 2-liter steam-heated glass flask fitted with a steam-heated glass tube leading to an updraft, water-cooled Friedrich condenser below which was a receiver immersed in water. The pressure was maintained at 200 millimeters of mercury, absolute. Over this same period, 200 milliliters of ethyl acetate was also fed dropwise to the heated flask.

There was collected in the receiver 511 grams of distillate containing 122 grams, by analysis, of peracetic acid in solution in ethyl acetate. This distillate was then fed dropwise through the same apparatus over a period of 75 minutes at a temperature of 98° C. and an absolute pressure of 100 millimeters of mercury. There was collected 435 grams of distillate found upon analysis to contain 116 grams of peracetic acid in solution in ethyl acetate. The yield of peracetic acid from acetaldehyde monoperacetate was 82 percent of theoretical.

*Example 14*

To a four-gallon capacity stainless steel reactor provided with diffusers was fed continuously 13 pounds per hour of a mixture of equal parts by weight of acetone and acetaldehyde. The temperature in the reactor was held at —5° C. Cylinder oxygen containing 3 percent of ozone, by volume, was fed into the reaction mixture through the diffusers at the rate of 20 cubic feet (standard conditions) per hour. Liquid was continuously withdrawn from the reactor at a rate such as to maintain a constant volume of 3.5 gallons in the reactor. The solution leaving the reactor was found by analysis to contain 26.5 percent of acetaldehyde monoperacetate and 3.2 percent of acetic acid by weight. Dimethyl dihydrogen pyrophosphate in the form of a 2.5 percent solution in acetone was fed at the rate of 55 milliliters per hour into the cold stream leaving the reactor. This pyrophosphate served as a sequestering agent for traces of dissolved metals, to minimize the catalysis of undesired side reactions.

This solution was fed through a small continuous-type evaporator operated at a temperature of 17° C. and at an absolute pressure of 165 millimeters of mercury to remove almost all of the unreacted aldehyde and part of the acetone. The residue which consisted essentially of a 40 to 50 percent solution of acetaldehyde monoperacetate in acetone, was conducted into a stream-heated coil where the acetaldehyde monoperacetate was decomposed and all of the solution vaporized at an absolute pressure of 165 millimeters of mercury and a temperature of 100° C. The vapors were introduced into a twenty-foot stainless steel column near the middle. The column was four inches in diameter and packed with ceramic saddles. Acetone was simultaneously fed through a vaporizer into the bottom of the column at the rate of 5.2 pounds per hour, with the column also operated at an absolute pressure of 165 millimeters of mercury. Acetaldehyde and acetone were removed at a rate such as maintained a head temperature of 20° C. while a solution was continuously withdrawn from the base of the column at the rate of 7.5 pounds per hour. The composition of this solution, determined by analysis, was peracetic acid, 28.3 percent; acetic acid, 5.9 percent; acetone 65 percent. The over-all chemical efficiency for the conversion of acetaldehyde to peracetic acid was 79 percent.

The separation of the aldehyde from the peracid can also be carried out at a total pressure for the system that is approximately atmospheric by passing a non-reactive gas or vapor through the reaction mixture to sweep out the aldehyde. Since the purpose of the inert gas or vapor would be to lower the temperature at which the still would otherwise be operated at the higher total pressure, the vapor should be that of a low boiling liquid. Illustrative of the gas or vapor that can be employed are nitrogen, carbon dioxide, the so-called rare gases neon, argon and the like, methane, diethyl ether, ethyl acetate, dimethyl ether, propane and the like.

*Example 15*

Cylinder oxygen was fed through a diffuser into a solution mixture of 285 grams (6.5 moles) of acetaldehyde and 95 grams of acetone maintained at a temperature of 2° to 5° C. while the mixture was irradiated with ultraviolet light. At the end of two hours when the reaction was stopped, the mixture weighed 440 grams and analyzed 54 percent of acetaldehyde monoperacetate. Cold acetone amounting to 300 milliliters was then added to the solution and most of the unreacted acetaldehyde was removed by distillation under reduced pressure with the kettle temperature maintained at —10° to —4° C. during the distillation. The absolute pressure at the end of the distillation was 9 millimeters of mercury. The residue amounting to 433 grams analyzed 52 percent acetaldehyde monoperacetate. Two hundred three milliliters of this solution, containing 106 grams of acetaldehyde monoperacetate, was fed over a period of one hour through a steam-heated coil at 100° C. into the column of a continuous still at about the middle of the column. The still was maintained at nearly atmospheric pressure (705 millimeters of mercury) and the head temperature at about 55° to 61° C. During this one hour period 310 milliliters of acetone was fed through a vaporizer into the column near the bottom. Acetone and acetaldehyde were removed as distillate. There was obtained as a residue at the bottom of the column 345 grams of acetone solution containing 30 grams of peracetic acid. The yield, based on the amount of acetaldehyde monoperacetate fed to the steam-heated coil, was 44 percent of the theoretical.

What is claimed is:

1. A process for making peracetic acid which comprises the steps of diffusing molecular oxygen into acetaldehyde at a temperature not higher than 15° C. while irradiating the acetaldehyde with ultraviolet light to form acetaldehyde monoperacetate; thereafter heating the acetaldehyde monoperacetate under reduced pressure and at a temperature above 15° C. to decompose it into peracetic acid and acetaldehyde as a by-product, such decomposition of the acetaldehyde monoperacetate being carried out catalytically at temperatures below 50° C. in the presence of an acidic esterification catalyst; and forthwith, while continuing to maintain a temperature above 15° C., separating in vapor form from the peracetic acid the by-product acetaldehyde continuously and simultaneously as it is produced in the decomposition.

2. A process for making peracetic acid which comprises the steps of diffusing molecular oxygen into acetaldehyde at a temperature not higher than —5° C. to 0° C. while irradiating the acetaldehyde with ultraviolet light to form acetaldehyde monoperacetate; thereafter heating the acetaldehyde monoperacetate under reduced pressure and at a temperature in the range of about 15° C. to 250° C. to decompose it into peracetic acid and acetaldehyde as a by-product, such decomposition of the acetaldehyde monoperacetate being carried out catalytically at temperatures below 50° C. in the presence of an acidic esterification catalyst; and forthwith, while continuing to maintain a temperature from 15° C. to 250° C., separating in vapor form from the peracetic acid the by-product acetaldehyde continuously and simultaneously as it is produced in the decomposition.

3. A process for making peracetic acid which comprises the steps of diffusing molecular oxygen into acetaldehyde at a temperature of about —5° C. to 0° C., while irradiating the acetaldehyde with ultraviolet light to form acetaldehyde monoperacetate, and thereafter heating the acetaldehyde monoperacetate at a temperature between 15° C. and 250° C. to decompose it into peracetic acid and acetaldehyde as a by-product, such decomposition of the acetaldehyde monoperacetate being carried out catalytically at temperatures below 50° C. in the presence of an acidic esterification catalyst; and forthwith fractionally distilling said peracetic acid and said by-product acetaldehyde under a pressure below atmospheric to separate them continuously and simultaneously as they are formed and produce said peracetic acid substantially free of acetaldehyde.

4. A process for making peracetic acid which comprises the steps of diffusing molecular oxygen into acetaldehyde at a temperature not higher than 15° C. while irradiating the acetaldehyde with ultraviolet light to form acetaldehyde monoperacetate; heating the acetaldehyde monoperacetate under reduced pressure and at a temperature between 15° C. and 250° C. to vaporize it with decomposition into peracetic acid and acetaldehyde as a by-product such decomposition being carried out catalytically at temperatures below 50° C. in the presence of an acidic esterification catalyst; passing the heated vapors into a separating and rectifying column while supplying a solvent for said peracetic acid to said column; removing said by-product acetaldehyde from said column in vapor form; and withdrawing from said column a solution of peracetic acid in said solvent substantially free of acetaldehyde.

5. In a process for making peracetic acid from acetaldehyde monoperacetate made by the oxidation of acetaldehyde with molecular oxygen at a temperature not higher than 15° C., wherein said acetaldehyde monoperacetate is in solution in a solvent non-reactive therewith, the steps which comprise heating said solution to decompose said acetaldehyde monoperacetate into acetaldehyde and peracetic acid, said heating being carried out under reduced pressure and at a temperature of from 50° C. to 200° C. in the absence of a catalyst; forthwith, while continuing to maintain a temperature of from 50° C. to 200° C., separating in vapor form and under reduced pressure from said peracetic acid the acetaldehyde continuously and simultaneously as it is produced in the decomposition; and recovering said peracetic acid in the form of a solution in said solvent.

6. In a process for producing peracetic acid from acetaldehyde monoperacetate made by the oxidation of acetaldehyde with molecular oxygen at a temperature not higher than 15° C., wherein said acetaldehyde monoperacetate is in solution in an excess of the acetaldehyde, the steps which comprise adding to said acetaldehyde monoperacetate a solvent therefor which is non-reactive therewith and vaporizing the unreacted acetaldehyde under reduced pressure and separating it from said acetaldehyde monoperacetate while maintaining the latter in solution; vaporizing acetaldehyde monoperacetate under reduced pressure while heating said acetaldehyde monoperacetate at a temperature between 15° C. to 250° C. to decompose it into peracetic acid and acetaldehyde as a by-product, such decomposition being carried out catalytically at temperatures below 50° C. in the presence of an acidic esterification catalyst; and forthwith, while continuing to maintain a temperature between 15° C. and 250° C., separating in vapor form from the peracetic acid the by-product acetaldehyde continuously and simultaneously as it is produced in the decomposition; and recovering said peracetic acid in the form of a solution in a solvent non-reactive therewith.

7. A process for making aliphatic monocarboxylic peracid having from two to three carbon atoms to the molecule which comprises the steps of reacting a saturated monoaldehyde of from two to three carbon atoms with oxygen at a temperature below 15° C. to form the aldehyde monoperacylate corresponding thereto; heating said aldehyde monoperacylate at a temperature above 15° C. to decompose it into the peracid and the aldehyde as a by-product, such decomposition of the aldehyde monoperacylate being carried out catalytically at temperatures between 15° C. and 50° C. in the presence of an acidic esterification catalyst; and forthwith, while continuing to maintain a temperature above 15° C., separating in vapor form from the peracid the by-product aldehyde continuously and simultaneously as it is produced in the decomposition recovering peracid free of the aldehyde.

8. A process for making peracetic acid which comprises the steps of first forming acetaldehyde monoperacetate, by oxidizing acetaldehyde with molecular oxygen in the liquid phase at a temperature not higher than 15° C., heating said acetaldehyde monoperacetate under reduced pressure to a temperature in the range of about 50° C. to 250° C. to vaporize it and decompose it into acetaldehyde and peracetic acid; and separating the acetaldehyde forthwith from the peracetic acid.

9. A process for making an aliphatic monocarboxylic peracid having from two to three carbon atoms to the molecule which comprises the steps of reacting a saturated monoaldehyde of from two to three carbon atoms with oxygen in the presence of ozone as catalyst and at a temperature below 15° C. to form the aldehyde monoperacylate corresponding thereto; heating said aldehyde monoperacylate at a temperature above 15° C. to decompose it into the peracid and the aldehyde as a by-product, such decomposition of the aldehyde monoperacylate being carried out catalytically at temperatures below 50° C. in the presence of an acidic esterification catalyst; and forthwith, while continuing to maintain a temperature above 15° C., separating in vapor form from the peracid the by-product aldehyde continuously and simultaneously as it is produced in the decomposition and recovering the peracid free of the aldehyde.

10. A process for making an aliphatic monocarboxylic peracid having from two to three carbon atoms to the molecule which comprises the steps of reacting a saturated aliphatic monoaldehyde of from two to three carbon atoms with oxygen at a temperature below 15° C. and in the presence of salt of a metal of the group consisting of cobalt, copper and iron as catalyst to form the aldehyde monoperacylate corresponding thereto; heating said aldehyde monoperacylate at a temperature above 15° C. to decompose it into the peracid and the aldehyde as a by-product, such decomposition of the aldehyde monoperacylate being carried out catalytically at temperatures below 50° C. in the presence of an acidic esterification catalyst; and forthwith, while continuing to maintain a temperature above 15° C., separating in vapor form from the peracid the by-product aldehyde continuously and simultaneously as it is produced in the decomposition and recovering the peracid free of the aldehyde.

11. A process for making peracetic acid which comprises the steps of diffusing oxygen containing a small amount of ozone into acetaldehyde at a temperature not higher than 15° C.; thereafter heating the acetaldehyde monoperacetate under reduced pressure and at a temperature above 15° C. to decompose it into peracetic acid and acetaldehyde as a by-product, such decomposition of the acetaldehyde monoperacetate being carried out catalytically at temperatures below 50° C. in the presence of an acidic esterification catalyst; and forthwith, while continuing to maintain a temperature above 15° C., separating in vapor form from the peracetic acid the by-product acetaldehyde continuously and simultaneously as it is produced in the decomposition.

12. A process for making peracetic acid which comprises the steps of diffusing oxygen containing a small amount of ozone into acetaldehyde at a temperature not higher than —5° C. to 0° C.; thereafter heating the acetaldehyde monoperacetate under reduced pressure and at a temperature in the range of about 15° to 250° C. to decompose it into peracetic acid and acetaldehyde as a by-product, such decomposition of the acetaldehyde monoperacetate being carried out catalytically at temperatures below 50° C. in the presence of an acidic esterification catalyst; and forthwith, separating in vapor form from the peracetic acid the by-product acetaldehyde continuously and simultaneously as it is produced in the decomposition.

13. A process for making peracetic acid which comprises the steps of diffusing oxygen containing a small amount of ozone into acetaldehyde at a temperature not higher than —5° C. to 0° C.; and thereafter heating the acetaldehyde monoperacetate at a higher temperature to decompose it into peracetic acid and acetaldehyde as a by-product, such higher temperature being at least 50° C. in the absence of an acidic esterification catalyst and simultaneously and continuously fractionally distilling said peracetic acid and the by-product acetaldehyde under a pressure below atmospheric to separate them forthwith as they are formed in the decomposition and produce said peracetic acid substantially free of acetaldehyde.

14. A process for making peracetic acid which comprises the steps of diffusing oxygen containing a small amount of ozone into acetaldehyde at a temperature not higher than 15° C.; heating the acetaldehyde monoperacetate under reduced pressure to vaporize it with decomposition into acetaldehyde and peracetic acid such heating being at a temperature of at least 50° C. in the absence of an acidic esterification catalyst; passing the heated vapors into a separating and rectifying column while supplying a solvent for said peracetic acid to said column; removing said acetaldehyde from said column in vapor form; and withdrawing from said column a solution of peracetic acid in said solvent substantially free of acetaldehyde.

15. A process according to claim 1 wherein the heating of the acetaldehyde monoperacetate to decompose it is carried out in the absence of a catalyst for the decomposition and at a temperature of at least 50° C.

16. A process according to claim 7 wherein the heating of the aldehyde monoperacylate to decompose it is carried out in the absence of a catalyst for the decomposition and at a temperature of at least 50° C.

17. A process according to claim 10 wherein the heating of the aldehyde monoperacylate to decompose it is carried out in the absence of a catalyst for the decomposition and at a temperature of at least 50° C.

18. A process for making perpropionic acid which comprises the steps of first forming propionaldehyde monoperpropionate, by oxidizing propionaldehyde with molecular oxygen in the liquid phase at a temperature not higher than 15° C., heating said propionaldehyde monoperpropionate under reduced pressure to a temperature in the range of about 50° C. to 250° C. to vaporize it and decompose it into propionaldehyde and perpropionic acid; and separating the propionaldehyde forthwith from the perpropionic acid.

References Cited in the file of this patent

UNITED STATES PATENTS

| | | |
|---|---|---|
| 1,179,421 | Galitzenstein et al. | Apr. 18, 1916 |
| 2,314,385 | Bludworth | Mar. 23, 1943 |

OTHER REFERENCES

Swern: Chem. Reviews, vol. 45, pp. 6 and 7 (1949).
Young: Chemistry and Industry, Nov. 5, 1949, p. 777.
Bawn et al.: Trans. Faraday Soc., vol. 47, pp. 731–734 (1951).